United States Patent
Sugiura

[11] 3,914,778
[45] Oct. 21, 1975

[54] PHOTOGRAPHIC CAMERA WITH A MECHANICAL SWITCHING SYSTEM
[75] Inventor: Yoji Sugiura, Yokohama, Japan
[73] Assignee: Canon Kabushiki Kaisha, Tokyo, Japan
[22] Filed: Aug. 23, 1974
[21] Appl. No.: 499,999

[30] Foreign Application Priority Data
Aug. 29, 1973 Japan............................ 48-101243

[52] U.S. Cl. ............................................. 354/268
[51] Int. Cl.² ...................................... G03B 17/38
[58] Field of Search ................................. 354/268

[56] References Cited
UNITED STATES PATENTS
3,728,946  4/1973  Kuramoto........................ 354/268

Primary Examiner—John M. Horan
Attorney, Agent, or Firm—Toren, McGeady and Stanger

[57] ABSTRACT

A camera of the type having a battery fed exposure meter and a film winding and shutter cocking lever which is displaceable through an idle angular distance between a retracted position and a starting position ready for cocking operation. A switch through which the battery circuit of an exposure meter is made is arranged to be operable by a manually pivotal control knob in cooperation with means for locking the cocking lever as well as with shutter release locking means. This is done in such a manner that when the switch is closed, the cocking lever is displaced to the starting position under the force of biasing means and the shutter release locking means is moved away from the range of movement of detent means connected to a shutter release. When the switch is opened, the cocking lever is rendered lockable by the locking means in the retracted position.

1 Claim, 4 Drawing Figures

PHOTOGRAPHIC CAMERA WITH A MECHANICAL SWITCHING SYSTEM

This invention relates to a camera with a mechanical switching system which may be used, more especially, for the automatic control of a battery fed exposure meter circuit.

In the case of cameras with a battery fed exposure meter, in order to prevent wasteful consumption of the electric energy in the battery, it is a known practice to arrange a switch in the battery circuit so that the exposure meter is connected to the battery only when photographing. In this arrangement, however, should the switch be open when photographing, faulty photographs may result due to the incapability of operating the exposure meter. Should it be left closed after exposure operations, the battery may be run down unnecessarily after a relatively short period of effective operation. For this reason, it has also been proposed to employ locking means for locking the cocking lever in its retracted position for cooperation with the aforesaid switch. In this case, the cocking lever is released from the locking means in response to the closure of the switch, being permitted under the action of a spring to move to a starting position ready for cocking operation. It cannot be moved back to the retracted position unless the switch has been opened. According to this construction, so long as the switch is open, the cocking lever cannot be withdrawn from the retracted position, and, therefore, the incapability of operating the locking lever assures that there is not chance of making incorrect exposure with the exposure meter disconnected from the battery. So long as the switch is closed, however, it is impossible to keep the cocking lever in a camera leather case because it extends backward from the camera housing, thereby very effectively preventing the occurrence of a possible accident that the camera is left unused with the exposure meter unnecessarily connected to the battery to run down wastefully. Such construction, however, in turn involves the drawback that there is some possibility of releasing the shutter mechanism with the exposure meter disconnected from the battery, because the position of the cocking lever cannot be affected by the opening of the switch which is accidentally encountered while still using the camera.

It is an object of the present invention to overcome these disadvantages of the known arrangements and to provide a mechanical switching system including a shutter release locking member cooperative with a manually switchable control knob associated with the switch in the battery circuit. Accordingly, when the switch is closed, the shutter release locking member is taken out of operative relationship with the shutter mechanism to permit shutter release operations, while when the switch is opened, the shutter mechanism is locked thereby to permit no shutter release operations.

The invention is illustrated by way of example in the accompanying drawings in which.

Figure 1:
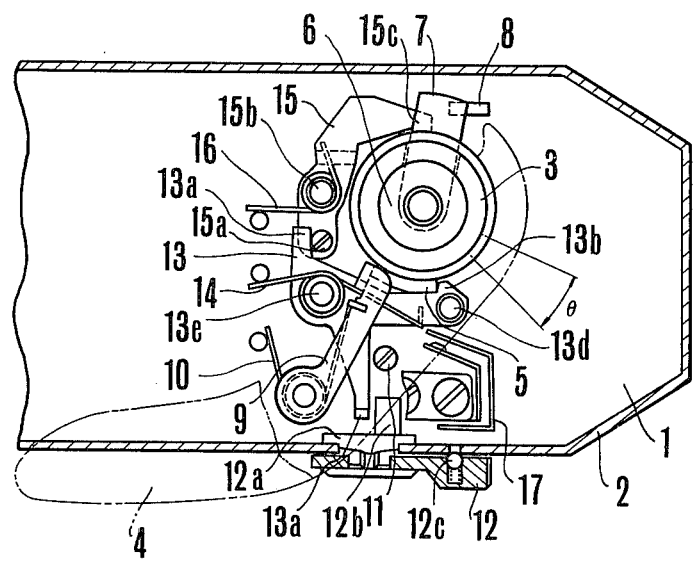
FIG. 1 is a schematic elevational view of a mechanical switching arrangement according to the present invention in an operative position in which the cocking lever is in the retracted position and the switch is in the opened position.
Figure 2:
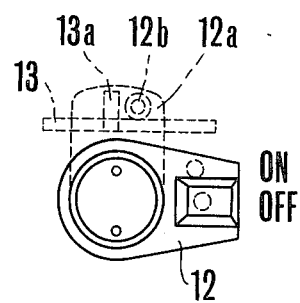
FIG. 2 is a fragmentary schematic top view of a manually switchable control knob in the "OFF" position associated with an actuating lever for the arrangement of FIG. 1.

Referring to the drawings, 1 is a fragment of a camera body having a front cover 2 and a hollow shaft 3 fixedly mounted on a film winding shaft not shown. In FIG. 1, a film winding and shutter cocking lever 4 is shown in phantom in the retracted position. Lever 4 is mounted on the outer peripheral of the hollow shaft 3 in such a manner that the lever 4 is turnable through an idle angle, $\theta$, about the axis of the shaft 3 without causing any turning movement of the shaft 3. Movably mounted in the hollow of the shaft 3 is a shutter release rod 6 from which an arm 7 extends in right angle relation therto above an operating member 8 for the shutter mechanism "not shown". One embodiment of a mechanical switching system according to the present invention comprises an arcuate protuberance 5, a three-armed lever 13 which is pivoted at a pin 13e and which is biased by a hairpin spring 14 in a counterclockwise direction to cause a pawl 13b provided in one arm thereof to engage the forward edge of the protuberance 5 when the lever 4 is in the retracted position, a lever 9 which at its rectangularly bent portion engages the rearward edge of the protuberance 5 and which is biased in a clockwise direction by a hairpin spring 10 tending to urge the lever 4 toward the starting position, and a two-armed lever 15 which is fulcrumed at a pivot pin 15b, which is biased in a clockwise direction by a hairpin spring 16. One arm 15e of this lever extends into the range of movement of the arm 7 when a switch 17 positioned adjacent an elongated insulated pin 13d on one arm of the lever 13 is open. Another arm of the lever 13 has an upstanding portion 13a extending into the range of movement of an elongated pin 12b fixedly carried on an end portion of an actuating lever 12a for the mechanical switching arrangement. The actuating lever 12 is connected to a manually switchable control knob 12 by a shaft passing through a hole provided through the front cover 2. The control knob 12 is operable between its ON and OFF positions in which the control knob 12 is arrested by a lick stopper 12c, When the knob 12 is set in the OFF position as shown in FIG. 2, the cocking lever 4 is lockable by the pawl 13b of the lever 13 in the retracted position as shown in FIG. 1. At this time, the switch 17 which may be used in the battery circuit of an exposure meter is open so that the exposure meter does not operate.

Figure 3:
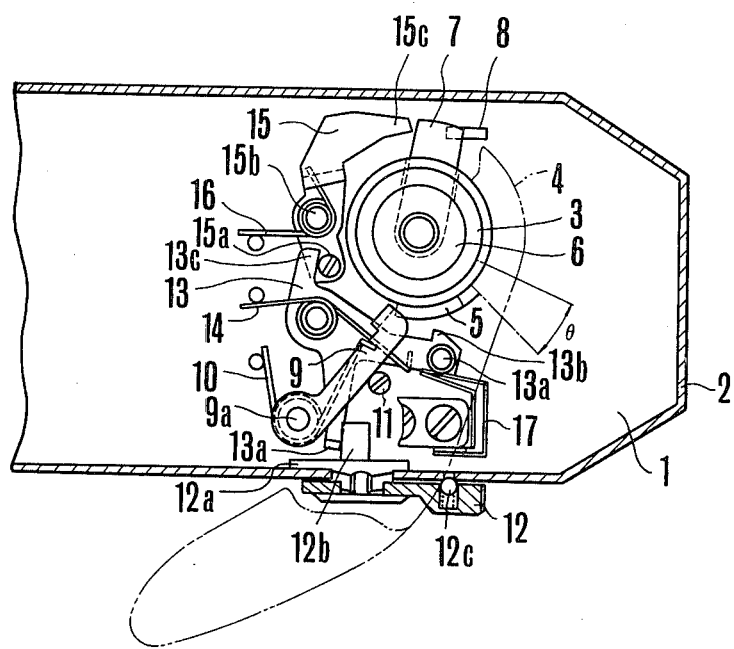
FIG. 3 is a schematic elevational view of the mechanical switching arrangement of FIG. 1 in another operative position in which the cocking lever is in the starting position ready for cocking operation and the switch is in the closed position.
Figure 4:
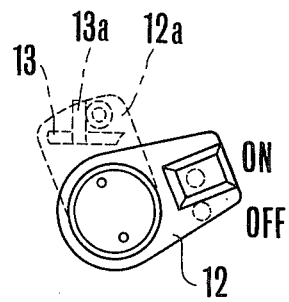
FIG. 4 is a fragmentary schematic top view of the manually switchable control knob of FIG. 2 in the "ON" position.

In operation of the mechanical switching arrangement shown in FIGS. 1 through 4, before exposure operation, the operator may set the knob 12 from the OFF position to the ON position, thereupon the pin 12b is turned in the counter-clockwise direction in engagement with the upstanding portion 13a, causing the lever 13 to turn in the clockwise direction about the shaft 13e against the force of the spring 14. Such a pivoting movement of the lever 13 results in the closure of the switch 17 in engagement with the insulated pin 13d as shown in FIG. 3. At this time, the protuberance 5 is disengaged from the pawl 13b so that the biasing lever 9 acts to turn the cocking lever 4 about the hollow shaft 3 through an idle angle, $\theta$, as the lever 9 is turned about the pivot pin 9a under the force of the spring 10, while the hollow shaft 3 remains stationary with respect to the film winding and shutter cocking mechanism, until the biasing lever 19 is arrested by the stopper 11, thereupon the cocking lever 4 is stopped in the starting positions ready for cocking operation. Also the pivoting movement of the lever 13 causes the release locking lever 15 to turn about the pin 15b in the counterclockwise direction against the force of the spring 16 in engagement of the pin 15a with the arm 13a. The result of this action is that the projection 15c is moved away from the range of movement of the arm 7 to permit the operation of the shutter release rod 6. During this operation, the lever 4 remains stationary in the starting position, therefore, it is impossible to know from the position of the lever 4 whether the switch 17 is closed or open, until the lever 4 is manually pushed into the retracted position. This drawback, however, results in no faulty exposure operation. This is because when the lever 13 is turned in the counterclockwise direction, the shutter release cocking lever 15 is turned in the clockwise direction under the force of the spring 16 causing the projection 15c to move into the range of movement of the arm 7 connected to the shutter release rod 6. Thereby the actuating member 8 for the shutter mechanism cannot be operated even when the shutter release button mounted on the upper end of the rod 6 is pressed.

In order to keep the camera in its leather case, it is necessary to set the control knob 12 to the OFF position and then return the cocking lever 4 to the retracted position in which it is locked by engagement of the protuberance 5 with the pawl 13b.

It will be seen from the foregoing description that the present invention is very effectively applicable to a camera with a battery supplied exposure meter for preventing the wasteful consumption of the energy in the battery due to the unnecessary connection of the exposure meter to the battery as well as due to complete elimination of faulty exposure operations.

What is claimed is:

1. In a camera of the type having a battery supplied exposure meter and having a cocking lever for film winding or shutter charging operation associated with a shutter release member, said cocking lever being displaceable through a certain idle angular distance between a retracted position and a starting position ready for cocking operation, a mechanical switching system cooperative with said cocking lever comprising:

a first locking means for locking said cocking lever in the retracted position;

a switch through which the battery circuit of an exposure meter is operated in response to an operation of said first locking means;

manually switchable means cooperative with said first locking means for setting said switch;

means for biasing said cocking lever toward said starting position; and second locking means for locking said shutter release member and being arranged to be moved into or away from the path of movement of output means connected to said shutter release member in response to an operation of said manually switchable means;

whereby when said manually switchable means is operated to close said switch, said cocking lever is disengaged from said first locking means, and when said manually switchable means is operated to open said switch, said first locking means is set into a position ready for locking said cocking lever, and simultaneously said second locking means is caused to move into the path of movement of the output means to prevent shutter release operations.

* * * * *